3,110,697
PROCESS FOR PREPARING POLYAMIDE YARNS HAVING IMPROVED RESISTANCE TO THE LIGHT

Luigi Notarbartolo, Milan, and Luigi Ciceri, Como, Italy, assignors to SNIA Viscosa Societa Nazionale Industria Applicazioni Viscosa S.p.A., Milan, Italy, a company of Italy
No Drawing. Filed Nov. 14, 1960, Ser. No. 68,621
Claims priority, application Italy July 2, 1960
7 Claims. (Cl. 260—45.75)

It is known that polyamide yarns when exposed to the light undergo a substantial degradation, which is particularly pronounced when the yarn contains titanium dioxide as a delustering agent. The sensitivity of the yarn to the light increases with its titanium dioxide content and when said content is between 0.5 and 3% by weight, the degradation is rapid.

It has been proposed since some time to incorporate in the polymer manganese compounds to reduce the catalytic effect of titanium dioxide with respect to light induced degradation.

Generally, inorganic manganese salts, in particular phosphates, are used, as they are stable at the temperature at which the polymer is prepared and subsequently is melted and extruded.

It is further necessary to employ manganese compounds that do not significantly colour the polymer.

Organic manganese compounds have not been used so far as they are very sensitive to the temperature at which the polymerization is carried out and are further sensitive to the presence of acetic acid or other acids generally used as stabilizers, that is to limit the length of the polymer chains. Thus, for instance, it has been suggested to employ as a manganese salt, the oxalate. This salt by itself is stable at the polymerization temperature; however, it reacts with acetic acid in the presence of water and is transformed into manganese acetate, which under heating and in the presence of water, becomes brown and colour the polymer.

It is an object of the present invention to provide polyamides, having improved stability to the light.

The present invention is characterized in that the polyamide forming monomers, the acetylamide of $\epsilon$-aminocaproic acid (having the formula $$CH_3-CONH-(CH_2)_5-COOH)$$

and the manganese salt of the acetylamide $\epsilon$-aminocaproic acid, which in turn has been obtained by reaction between an inorganic manganese salt, preferably the carbonate, and the acetylamide of aminocaproic acid, are added to the polyamide forming monomers before polymerizing the same in a manner known per se.

The polymer thus obtained is stable to the light when delustered with titanium dioxide in amounts variable from 0.2 to 3%.

The acetylamide serves as a polymer chain stabilizer, and therefore no other stabilizers such as acetic acid are added. It is preferably prepared by reacting $\epsilon$-aminocaproic acid with acetic anhydride.

The preparation is carried out according to the following example:

In a 1000 cc. beaker g. 131 (1 mol) of $\epsilon$-aminocaproic acid are reacted with g. 204 (2 mols) of acetic anhydride at room temperature. At the end of the reaction, which is exothermic, the solution is diluted with 100 cc. of water and the excess of water introduced and the acetic acid formed are distilled under a vacuum (12 mm. Hg residual pressure) at a temperature of 110° C. The residue (solid at room temperature) is dissolved in 150 cc. of boiling water.

By cooling, the acetylamide crystallizes and is collected and dried in an oven under a vacuum with a yield of 120 g. of dried product. The product is a white crystalline solid having a melting point of 105–108° C. which, according to the present invention, is used as a chain stabilizer together with a manganese salt of the same acetylamide.

The manganese salt of the acetylamide is prepared as follows. The acetylamide is reacted in boiling aqueous solution with manganese carbonate in equivalent proportions until the $CO_2$ has completely evolved. The solution thus obtained is employed by adding it to the monomer to be polymerized in quantities, calculated as manganese salt of the acetylamide, comprised between 0.007 and 0.07 and preferably between 0.003 and 0.04% by weight of the monomer. Correspondingly, an amount of acetylamide corresponding to the mean molecular weight of the polymer which it is desired to obtain, and preferably between 1 mol per 80 mols of monomer and 1 mol per 320 mols of monomer, is used as a stabilizer of the polymer chain in the polymerization.

Another method which can be used consists in preparing a solution of the acetylamide of aminocaproic acid containing the amount required to stabilize the polymer chains with an excess proportional to the anionic quantity required to obtain the manganese salt in the amount required for the stabilization of the polymer to the light, adding and reacting in the hot the manganese carbonate in the stoichiometric quantity corresponding to said excess, and using the solution thus obtained as a chain stabilizing means and a light stabilizer means concurrently.

In any case, the acetylamide of aminocaproic acid and its manganese salt are added to the monomers or solutions thereof, together with the catalysts (if required) and delustering agents, and the polymerization is carried out in the usual manner in batch operation or continuously, viz.: when the monomer is caprolactam, by heating in the presence, at least initially, of at least 0.1% by weight of water with respect to the monomer, at temperatures of 180°–350° C., and preferably 240°–300° C., until the desired viscosity is reached (usually for 6–36 hours), the use of a pressure of 1–20 atm. being optional but the pressure being in any case discharged and, if desired but not necessarily, a reduced pressure being employed, towards the end of the reaction.

When the monomer is the adipate of hexamethylenediammonium or/metaxylxylenediammonium, by heating initially in the presence of enough water to render the reactions mass fluid (preferably 30–60% by weight of monomer, in a closed vessel, at temperatures of at least 180° C. and preferably 180–240° C. and preferably at pressures of 2–20 atm., preferably until a substantial equilibrium has been reached by formation of a relatively low molecular weight polymer, and subsequently discharging the pressure built up in the closed vessel and continuing heating at temperatures of 240–350° C. and preferably 260–290° C., optionally under an inert gas stream or reduced pressure, until the desired viscosity has been reached, usually for 1–10 hours.

When the monomer is 11-aminoundecanoic acid, by heating a mixture of monomer and water, the latter being 10–300% and preferably 20–60% by weight of the monomer, in a closed vessel and temperatures of 150–230° C. and preferably at pressures of 3–15 atm., preferably until a substantial equilibrium has been reached by formulation of a relatively low molecular weight polymer, and subsequently discharging the pressure and continuing heating at temperatures of 190–320° C. and preferably 230–280° C., optionally under an inert gas stream or reduced pressure, until the desired viscosity has been reached, usually for 2–15 hours; or by forming a solution or suspension of the monomer in water, atomizing the same, quickly evaporating the water thereof by contact with surfaces heated to at least 180° C., causing the formation of a relatively low molecular weight polymer, and then completing the condensation as hereinbefore set forth.

In all cases there are obtained white polymers which yield yarns stable to the light even in the presence of a high content of delustering $TiO_2$ (2–3%).

The invention will be better understood by the description of the following non-limitative embodiments:

Example 1

In a 20 l. autoclave there are introduced kg. 12 of ε-caprolactam containing g. 54 of titanium dioxide type Anatase, 500 cc. of water, g. 54.78 of the acetylamide of aminocaproic acid and 150 cc. of a boiling aqueous solution containing g. 4.36 of the manganese salt of the acetylamide of ε-aminocaproic acid obtained by reacting until complete evolution of $CO_2$ an aqueous solution of g. 3.78 of the acetylamide of ε-aminocaproic acid with g. 1.25 of freshly prepared manganese carbonate.

The autoclave is brought in the course of 2 hours, to a temperature of 260° C. while progressively discharging the water vapour and is maintained at such temperature and at atmospheric pressure for 14 hours under stirring. At this point, the autoclave is brought in 2 hours by progressive application of vacuum to the residual pressure of 240 mm. Hg. Finally the polymer formed is extruded by inert gas pressure, and is cooled down and cut into regular chips.

The polymer obtained appears perfectly white and has a relative viscosity in sulphuric acid (concentration 1%) of 2.70. After washing and drying, the polymer is spun in a spinning head provided with a melting grid in the counts 15 deniers monofilament and 30 deniers 6 filaments.

The stability to the light is determined by calculating the tenacity drop found on ribbons washed and set made from the experimental yarn obtained, after exposure of the same to the light in a Fade-Ometer apparatus of the Atlas Electric Devices Co., Chicago, under the conditions established by ASTM (Standards on Textile Materials) D. 506, 50T, edition 1951, page 174 and following. The improved stability to the light of the yarns obtained from this polymer is easily evidenced.

After 100 hours of exposure to the Fade-Ometer a mean percentage tenacity drop is found of 2% for the 15/1 count and 3.5% for the 30/6 count, while the yarn from a polymer obtained under the same conditions described but without the addition of the manganese salt of the acetylamide of aminocaproic acid, shows after 100 hours of exposure a mean tenacity drop of 43% for the 15/1 count and 57% for the 30/6 count.

Example 2

The operations of Example 1 are repeated, but g. 240 (2% by weight of the monomer) of titanium dioxide type Anatase are employed as delustering agent.

The polymer obtained appears perfectly white and has a relative viscosity in sulphuric acid solution of 2.81. The mean percentage tenacity drop of the yarns obtained from this polymer after 100 hours of exposure in the Fade-Ometer under the conditions described in Example 1 is 6% for the 15/1 count and 10% for the 40/10 count against a mean drop of 41% for the 15/1 count and 70% for the 40/10 count found in the yarn from a polymer obtained under the same conditions but without the addition of the manganese salt of the acetylamide of ε-aminocaproic acid.

Example 3

The operations of Example 1 are repeated but g. 54 of titanium dioxide type Anatase LF are used as delustering agent. This type of $TiO_2$ is a product of the British Titan Products, particularly treated to improve its resistance to the light.

The polymer obtained appears perfectly white and has a relative viscosity in sulphuric acid solution of 2.77. The mean percentage tenacity drop of the yarns obtained from this polymer after 100 hours of exposure in the Fade-Ometer under the conditions described in Example 1 is 3% for the 15/1 count and 7% for the 30/6 count against a mean drop of 29% for the 15/1 count and 42% for the 30/6 count found in the yarn from a polymer obtained under the same conditions but without the addition of the manganese salt of the acetylamide of aminocaproic acid.

Example 4

The operations of Example 1 are repeated, but g. 54 of titanium dioxide type Unitane O–310 is employed as delustering agent. This type of titanium is a product of the American Cyanamid Corporation, particularly treated to improve its resistance to the light.

The polymer obtained appears perfectly white and has a relative viscosity in sulphuric acid solution of 2.73.

The mean percentage tenacity drop of the yarns obtained from this polymer after 100 hours of exposure in the Fade-Ometer under the conditions described in Example 1, is 1% for the 15/1 count and 3% for the 30/6 count against a mean drop of 25% for the 15/1 count and 38% for the 30/6 count found in the yarn from a polymer obtained under the same conditions but without the addition of the manganese salt of the acetylamide of aminocaproic acid.

Example 5

In a 20 litres autoclave there are introduced kg. 7 of hexamethylene-diammonium adipate containing 0.45% by weight of titanium dioxide type Anatase and 130 cc. of a boiling aqueous solution obtained by reacting until complete evolution of the $CO_2$, g. 76.5 of the acetylamide of aminocaproic acid with 0.73 g. of freshly prepared manganese carbonate.

The polymerization is carried out in the following manner:

50% of the water introduced is eliminated at 110° C. by distillation, then the temperature is raised in 1 hour to 180° C. and the pressure to 5 atm. The temperature is then further raised up to 250° C. while maintaining the same pressure.

The pressure is progressively lowered during 1 hour to atmospheric pressure while bringing the mass to 275° C. and maintaining it at this temperature under stirring for 2 hours.

At this point the autoclave is progressively brought by the application of vacuum in 1 hour to a residual pressure of a few millimeters Hg and maintained under these conditions for another half hour. Finally an inert gas pressure is established and the polymer formed is extruded, cooled down and cut into regular chips. The polymer obtained is perfectly white and has an intrinsic viscosity in a metacresol solution of 1.12.

The mean tenacity drop of the yarns obtained from this polymer after 100 hours of exposure in the Fade-Ometer under the conditions described in Example 1, is 2% for the 15/1 count and 4% for the 30/6 count, against a mean drop of 32% for the 15/1 count and 48% for the 30/6 count found in the yarn from a polymer obtained under the same conditions but without the addition of the manganese salt of the acetylamide of aminocaproic acid.

Example 6

The operations of Example 5 are repeated but the monomer employed consists in 7 kg. metaxylylene diammonium adipate.

The polymerization is conducted according to the cycle described in Example 5 for hexamethylene diammonium adipate.

The polymer obtained appears perfectly white and has an intrinsic viscosity in metacresol solution of 0.92.

The mean tenacity drop of the yarns obtained from this polymer after 100 hours of exposure in the Fade-Ometer, under the conditions described in Example 1, is 6% for the 15/1 count and 9% for the 30/6 count against a mean drop of 52% for the 15/1 count and 58% for the 30/6 count found in a yarn from a polymer obtained under the same conditions but without the addition of the manganese salt of the acetylamide of aminocaproic acid.

*Example 7*

The operations of Example 5 are repeated, but the monomer employed consists in 12 kg. of 11-amino-undecanoic acid containing g. 54 of titanium dioxide type Anatase, 3.800 kg. of distilled water and 150 cc. of a boiling aqueous solution obtained by reacting g. 98.7 of the acetylamide of aminocaproic acid with g. 1.25 of freshly prepared manganese carbonate.

The autoclave is brought to 180° C. and 8 atm. of pressure in about 2 hours. The temperature is then further raised to 225° C. while the pressure is maintained at 8 atm. by discharging the gases.

Thereafter the pressure is progressively lowered in 2 hours to atmospheric pressure while the mass is brought to a temperature of 260° C. and is maintained under these conditions under stirring for 4 hours.

At this point a moderate stream of an inert gas is passed during half an hour and finally the polymer formed is extruded, cooled down and cut into regular chips.

The polymer obtained appears perfectly white and has an intrinsic viscosity in metacresol solution of 0.97.

The mean tenacity drop of the yarns obtained from this polymer after exposure to the Fade-Ometer under the conditions described in Example 1, is 3% for the 15/1 count and 6% for the 30/6 count against a mean drop of 38% for the 15/1 count and 42% for the 30/6 count found in the yarn from a polymer obtained under the same conditions but without the addition of the manganese salt of the acetylamide of aminocaproic acid.

We claim:

1. A process for the preparation of light-stable, color-free polyamides, comprising the step of carrying out the polymerization of the polyamide forming monomers in the initial presence of the acetylamide of ε-aminocaproic acid and the manganese salt of said acetylamide.

2. A process according to claim 1, wherein the manganese salt of the acetylamide is obtained by reaction between an inorganic salt of manganese and the acetylamide itself.

3. A process according to claim 1, wherein the acetylamide is used as a polymer chain stabilizer in an amount comprised between 1 mol per 80 mols of monomer and 1 mol per 320 mols of monomer.

4. A process according to claim 1, wherein the manganese salt of the acetylamide of aminocaproic acid is employed in amounts comprised between 0.007 and 0.07%.

5. A process according to claim 1, comprising preparing a solution of the acetylamide of aminocaproic acid containing the amount necessary to the stabilization of the polymer chains plus an excess proportional to the anionic amount required to obtain the amount of manganese salt necessary for the stabilization of the polymer to the light, adding manganese carbonate to the solution in the stoichiometric amount corresponding to said excess and reacting the same in the hot, and using the resulting solution as polymer chain stabilizing means and light stabilizing means concurrently.

6. A process according to claim 1, wherein the monomer is caprolactam.

7. A process for the preparation of light-stable, color-free polyamides, comprising the step of carrying out the polymerization of the polyamide forming monomers in the initial presence of the acetylamide of ε-aminocaproic acid in an amount not less than one mol per 320 mols of monomer and not more than 1 mol per 80 mols of monomer and of the manganese salt of said acetylamide in an amount not less than 0.03% by weight and not more than 0.04% by weight of the monomer.

References Cited in the file of this patent

UNITED STATES PATENTS

| | | |
|---|---|---|
| 2,887,462 | Van Oot | May 19, 1959 |
| 2,984,647 | White | May 16, 1961 |

FOREIGN PATENTS

| | | |
|---|---|---|
| 955,259 | France | Jan. 9, 1950 |